United States Patent
Kelly

(10) Patent No.: US 7,853,701 B2
(45) Date of Patent: Dec. 14, 2010

(54) METHOD FOR INTELLIGENT, SELF-MANAGED, DECENTRALIZED CONNECTION POOL MANAGEMENT POOL

(75) Inventor: David M. Kelly, Vellejo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 174 days.

(21) Appl. No.: 12/133,851

(22) Filed: Jun. 5, 2008

(65) Prior Publication Data

US 2008/0307098 A1    Dec. 11, 2008

Related U.S. Application Data

(60) Provisional application No. 60/942,940, filed on Jun. 8, 2007.

(51) Int. Cl.
*G06F 15/16* (2006.01)
*G06F 15/173* (2006.01)

(52) U.S. Cl. .............. 709/227; 709/217; 709/226; 709/232; 709/238; 709/248

(58) Field of Classification Search .............. 709/227
See application file for complete search history.

(56) References Cited

U.S. PATENT DOCUMENTS

| 6,324,581 | B1 * | 11/2001 | Xu et al. ............... 709/229 |
| 6,523,027 | B1 * | 2/2003 | Underwood ............ 707/4 |
| 6,785,726 | B1 * | 8/2004 | Freeman et al. ........ 709/227 |

* cited by examiner

*Primary Examiner*—Ario Etienne
*Assistant Examiner*—Blake Rubin
(74) *Attorney, Agent, or Firm*—Fliesler Meyer LLP

(57) ABSTRACT

A system, method and computer readable medium are provided which include a server which can be connected to a set of other servers using a connection pool of connections. When information is to be sent to one of the set of other servers, the server can obtain a connection from the connection pool.

21 Claims, 2 Drawing Sheets

METHOD FOR INTELLIGENT, SELF-MANAGED, DECENTRALIZED CONNECTION POOL MANAGEMENT POOL

CLAIM OF PRIORITY

This application claims priority from the following co-pending application, which is hereby incorporated in their entirety: U.S. Provisional Patent Application No. 60/942,940 entitled "METHOD FOR INTELLIGENT, SELF-MANAGED, DECENTRALIZED CONNECTION POOL MANAGEMENT POOL", by David Kelly filed on Jun. 8, 2007.

BACKGROUND

The present invention relates to the transfer of information between servers.

Often multiple servers, such as search servers or application servers need to communicate. A typical technique is for the servers to open a dedicated TCP/IP connection with other servers when they need to communicate.

DETAILED DESCRIPTION

Figure 1:
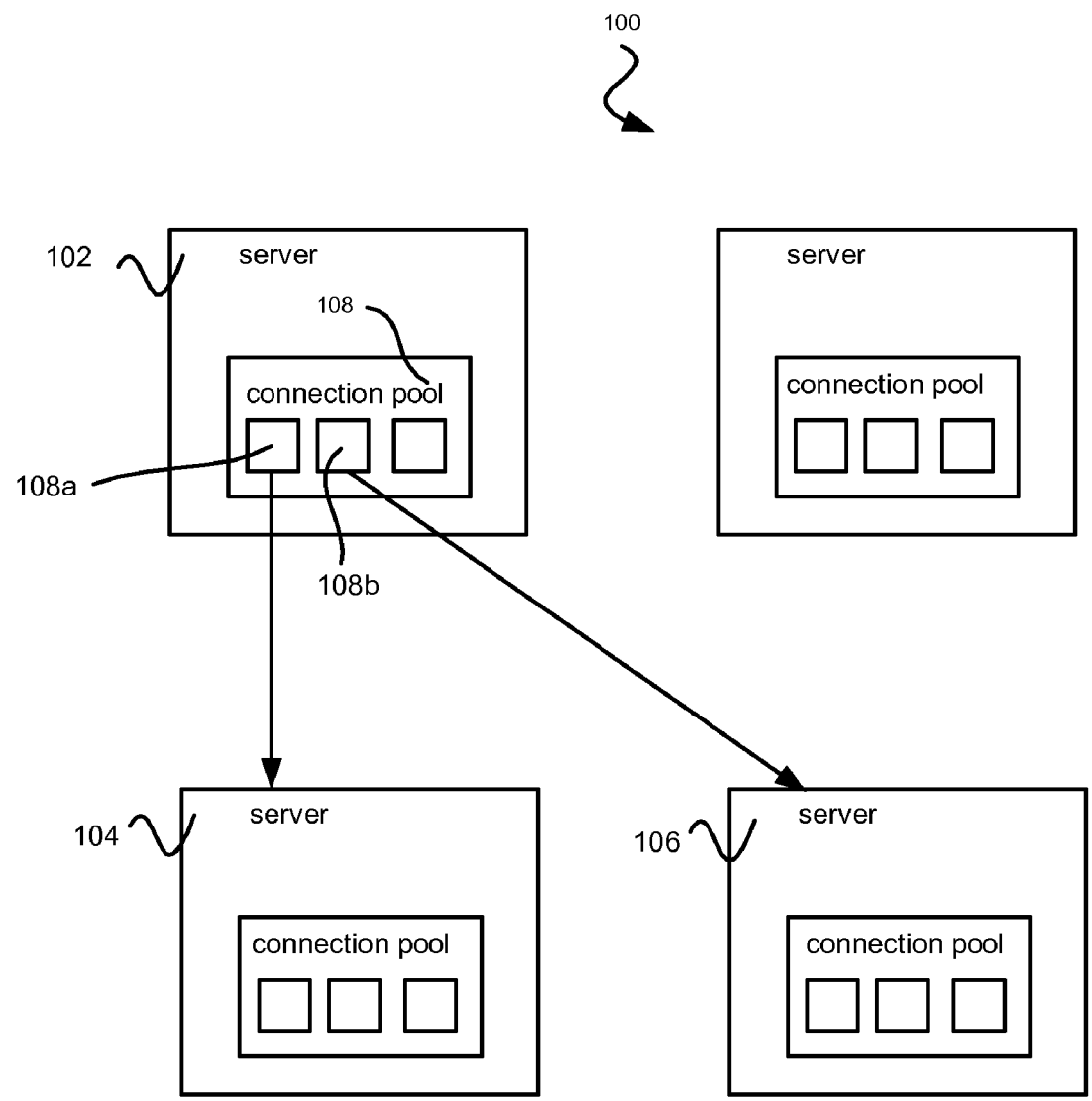
FIG. 1 shows a system where servers use a connection pool to connect to other servers.

In one embodiment, a system 100 comprises a server 102 connected to a set of other servers 104 and 106 using a connection pool of connections. When information is to be sent to one of the set of other servers 104 and 106, the server 102 can obtain a connection 108a or 108b from the connection pool 108.

The connection pool 108 can set up the connections 108a and 108b before the server 102 needs to use the connections. The connections 108a and 108b can be TCP connections.

Figure 2:
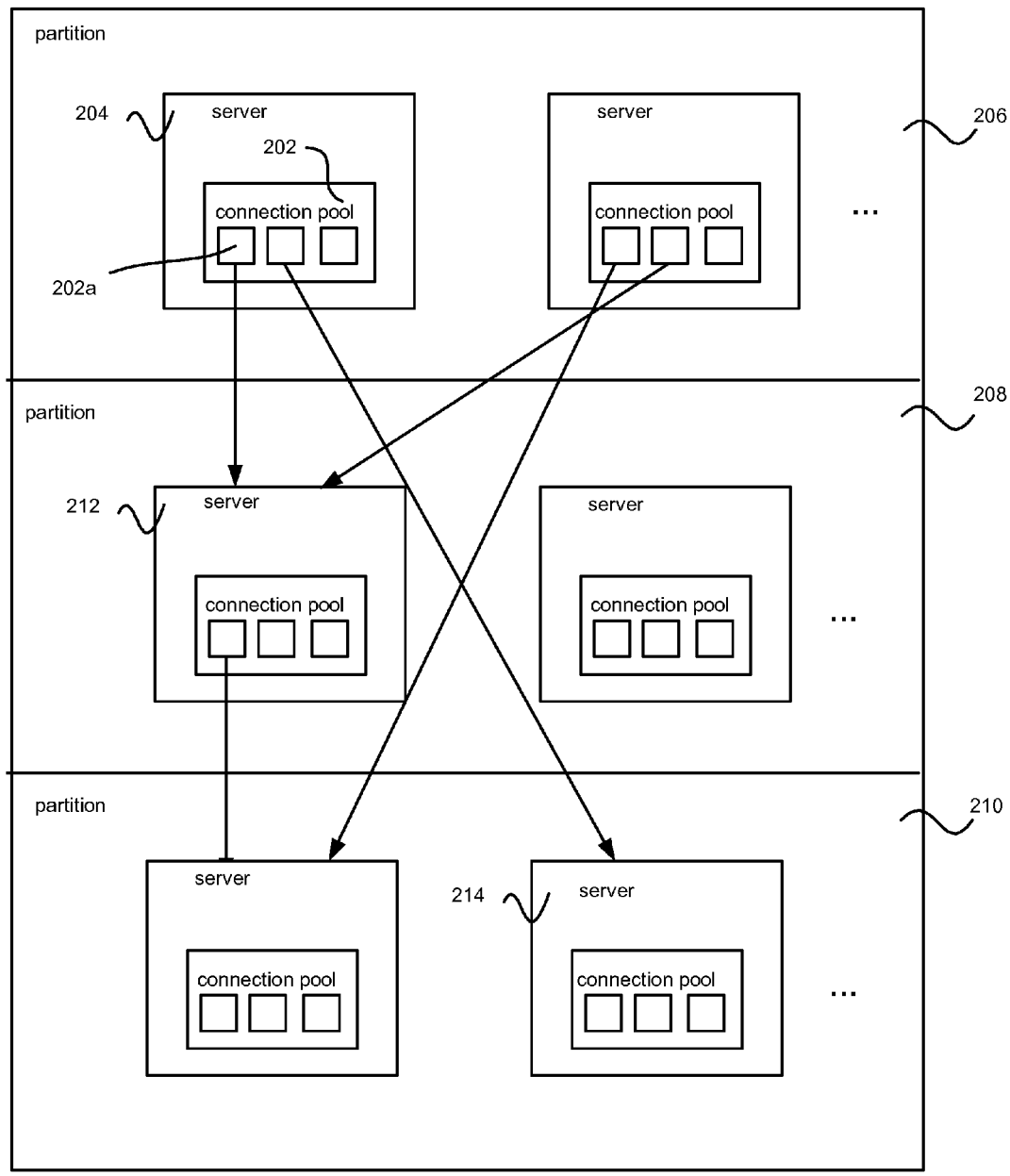
FIG. 2 shows a system where the connection pools provide a connection from a server in one partition to a server in another partition.

FIG. 2 shows a system where a connection pool 202 at a server makes connection with one server in each of multiple sets of servers. For example, if an operation needs to obtain data from one of the servers in each of a partition 206, 208 and 210, the connection pool can be used to get a connection to the needed servers. For example, server 204 can use connection pool 202 to get a connection 202a to server 212 in partition 208 and server 214 in partition 210.

The connection pool can be aware of the topology of the network. In the example of FIG. 2, the connection pool can be aware of the partition arrangement of the servers of FIG. 2 and provide a connection to a server in each of the other partitions. In one example, the connection pool uses the partition information to pass a request to one and only one server in the other partitions.

The connection pool can be in charge of keeping connections open and assigning the connections as needed.

The search data can be stored in partitions, each partition containing a portion of the search data. For example, the search servers can store parts of the search data in each partition. Each server of a partition can store the same data. Searches can get search data from each partition to provide a single output. A description of such a system is given in the patent application "Improved Search System" Ser. No. 60/821,621 incorporated herein by reference.

The servers can check for incoming data from the connections. This can be done by using a queue or other structure.

Embodiments of the present invention can include computer-based methods and systems which may be implemented using conventional general purpose or a specialized digital computer(s) or microprocessor(s), programmed according to the teachings of the present disclosure. Appropriate software coding can readily be prepared by programmers based on the teachings of the present disclosure.

Embodiments of the present invention can include a computer readable medium, such as computer readable storage medium. The computer readable storage medium can have stored instructions which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory or any media or device suitable for storing instructions and/or data. The present invention can include software for controlling both the hardware of a computer, such as general purpose/specialized computer(s) or microprocessor(s), and for enabling them to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer-implemented method for transmitting the code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The forgoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

The invention claimed is:

1. A computer implemented system comprising:
    a plurality of servers for use in providing data in response to requests, wherein each of the servers are operable to communicate with one another;
    a plurality of partitions defined within the plurality of servers, wherein each of the partitions includes one or more of the servers;
    a plurality of connection pools, including a connection pool at each of the servers in each partition, which allows that server to make a connection with other servers in other partitions,
    data, provided as a plurality of portions and stored in the plurality of partitions, wherein each partition includes a different portion of the data, and wherein within each of the partitions, the portion of the data stored in that partition is copied to every server in that partition; and
    wherein when a request is received by a first server in a first partition, the first server
        opens connections to at least a second server in a second partition, by obtaining the connections from its connection pool,
        retrieves the different portion of the data from the second partition,
        combines the portions of the data from the first and second partitions to create a combined data, and
        returns the combined data in response to the request.

2. The computer implemented system of claim 1, wherein the connections are TCP connections.

3. The computer implemented system of claim 1, wherein the connection pool is aware of the topology of the network.

4. The computer implemented system of claim 1, wherein the servers are search servers.

5. The computer implemented system of claim 4, wherein the data stored in the plurality of partitions is search data, each partition containing a portion of the search data.

6. The computer implemented system of claim 5, wherein a request is sent out through the connection pool to a server in each other partition.

7. The computer implemented system of claim 1, wherein the servers check for incoming data from the connections.

8. A server comprising:
    a connection pool, associated with the server, connecting the server to a plurality of partitions defined within a plurality of servers, wherein each partition includes one or more of the servers, including a first partition which includes the server, and wherein each server is for use in providing data in response to requests;
    wherein the connection pool allows the server to make a connection with other servers in other partitions;
    wherein data, provided as a plurality of portions, is stored in the plurality of partitions, wherein each partition includes a different portion of the data, and wherein within each of the partitions, the portion of the data stored in that partition is copied to every server in that partition; and
    wherein when a request is received by the server, the server
        opens connections to at least one server in a second partition, by obtaining the connections from the connection pool,
        retrieves the different portion of the data from the second partition,
        combines the portions of the data from the first and second partitions to create a combined data, and
        returns the combined data in response to the request.

9. The server of claim 8, wherein the connections are TCP connections.

10. The server of claim 8, wherein the connection pool is aware of the topology of the network.

11. The server of claim 8, wherein the servers are search servers.

12. The server of claim 8, wherein the data stored in the plurality of partitions is search data, each partition containing a portion of the search data.

13. The server of claim 8, wherein a request is sent out through the connection pool to a server in each other partition.

14. The server of claim 8, wherein the servers check for incoming data from the connections.

15. The computer implemented system of claim 1 further comprising:
    wherein the requested data is an index of documents, and wherein each portion of data is a partial index; and
    wherein, when a request is received by the first server in the first partition, the first server
        combines each of the partial indices to create a combined index, and
        sorts the contents of the combined index according to at least a relevance criteria,
        before returning the combined index as a response to the request.

16. The computer implemented system of claim 1 wherein each connection pool can open connections to other servers before the first server needs the connections.

17. The computer implemented system of claim 1 wherein when the request is received by the first server in the first partition, the first server further:
    opens a connection to a third server in a third partition;
    retrieves a third different portion of the data from the third server;
    combines the portions of the data from the first, second and third partitions to create a combined data, and
    returns the combined data in response to the request.

18. The computer implemented system of claim 1 wherein the first connection pool uses partition information to open a connection to only one server in a particular partition.

19. The server of claim 8 further comprising:
    wherein the requested data is an index of documents, and wherein each portion of data is a partial index; and
    wherein, when a request is received by the server in the first partition, the server
        combines each of the partial indices to create a combined index, and
        sorts the contents of the combined index according to at least a relevance criteria,
        before returning the combined index as a response to the request.

20. The server of claim 8 wherein each connection pool can open connections to other servers before the server needs the connections.

21. The server of claim 8 wherein when the request is received by the server, the server further:
    opens a connection to a third server in a third partition;
    retrieves a third different portion of the data from the third server;
    combines the portions of the data from the first, second and third partitions to create a combined data, and
    returns the combined data in response to the request.

* * * * *

UNITED STATES PATENT AND TRADEMARK OFFICE
CERTIFICATE OF CORRECTION

| | | |
|---|---|---|
| PATENT NO. | : 7,853,701 B2 | Page 1 of 1 |
| APPLICATION NO. | : 12/133851 | |
| DATED | : December 14, 2010 | |
| INVENTOR(S) | : David M. Kelly | |

It is certified that error appears in the above-identified patent and that said Letters Patent is hereby corrected as shown below:

Title page, Item (75), "Inventor", line 1, delete "Vellejo," and insert -- Vallejo, --, therefor.

Signed and Sealed this
Ninth Day of August, 2011

David J. Kappos
*Director of the United States Patent and Trademark Office*